Aug. 18, 1970  J. F. GRUNDMANN ET AL  3,524,473
FLOW CONTROL VALVE HAVING CONSTANT OUTLET ORIFICE AREA
Filed Jan. 11, 1968  3 Sheets-Sheet 1
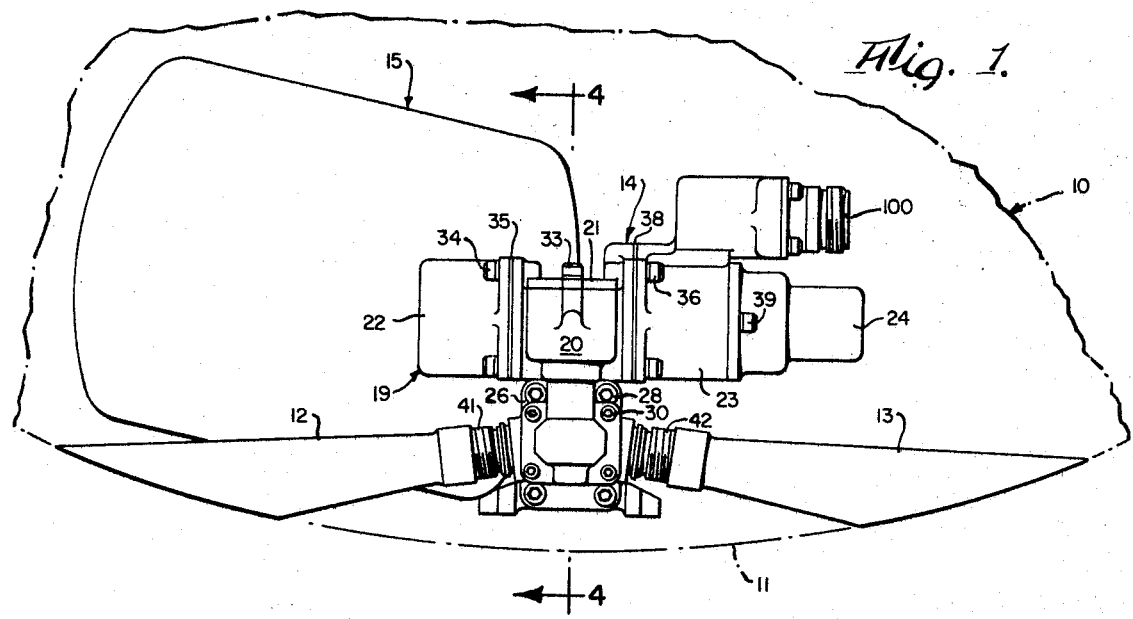
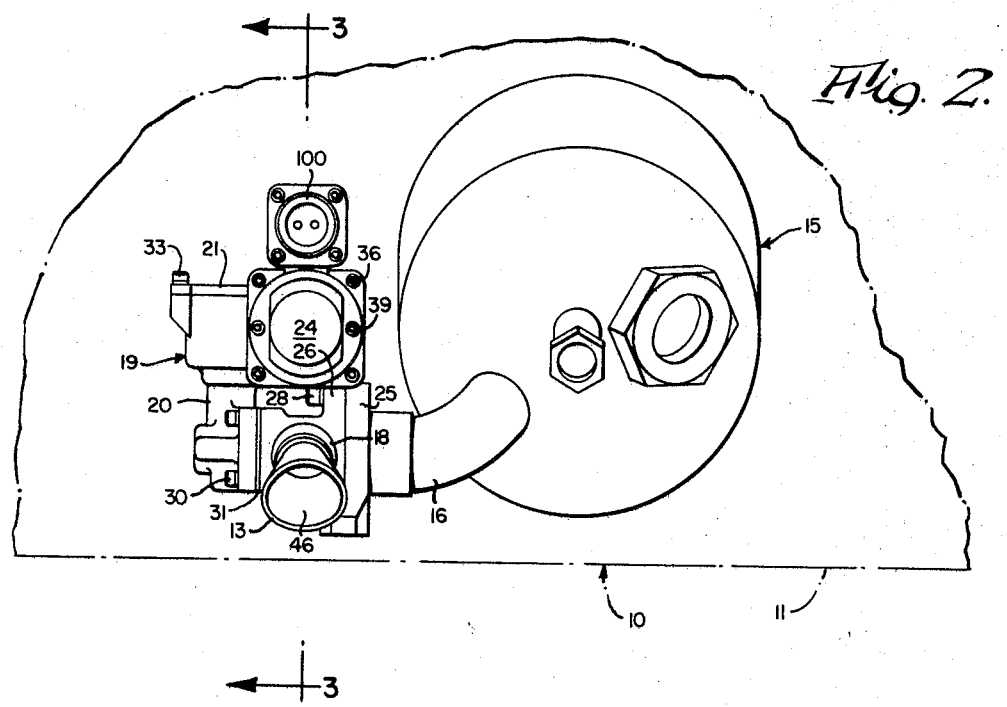
INVENTORS
John F. Grundmann
James W. Hager
BY
Popp and Sommer
ATTORNEYS Aug. 18, 1970    J. F. GRUNDMANN ET AL    3,524,473
FLOW CONTROL VALVE HAVING CONSTANT OUTLET ORIFICE AREA
Filed Jan. 11, 1968    3 Sheets-Sheet 2

INVENTORS
John F. Grundmann
James W. Hager
BY
Popp and Sommer
ATTORNEYS

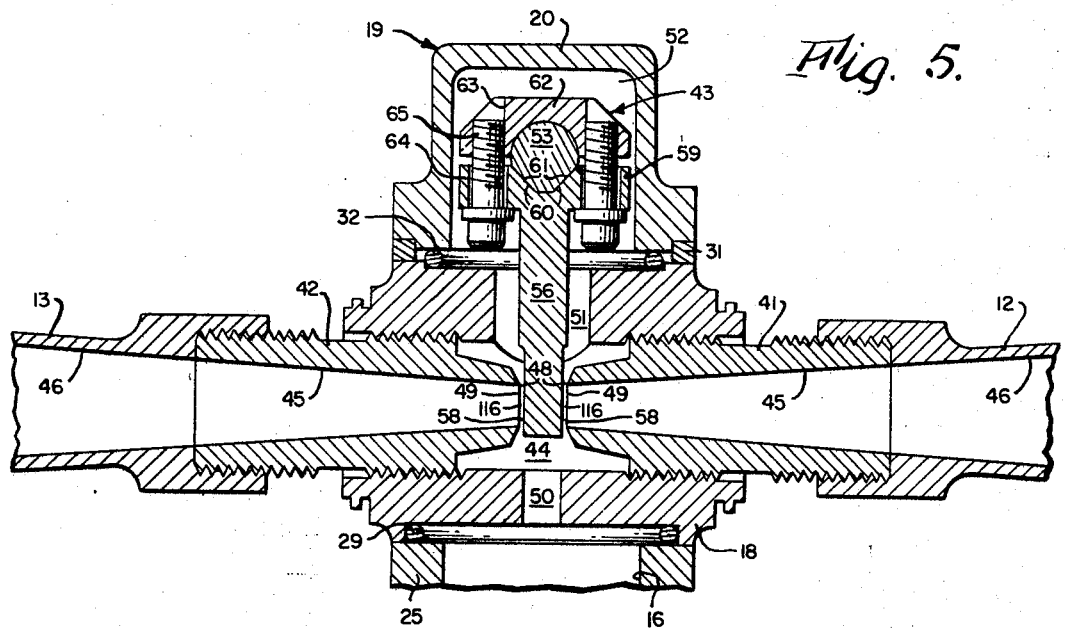

United States Patent Office 3,524,473
Patented Aug. 18, 1970

3,524,473
FLOW CONTROL VALVE HAVING CONSTANT OUTLET ORIFICE AREA
John F. Grundmann, Redondo Beach, and James W. Hager, San Marino, Calif., assignors to Moog Inc., East Aurora, N.Y., a corporation of New York
Filed Jan. 11, 1968, Ser. No. 697,191
Int. Cl. F16k 11/00
U.S. Cl. 137—625.44                11 Claims

ABSTRACT OF THE DISCLOSURE

A valve which controls the flow of fluid through a pair of outlets, characterized by the features of thermally and otherwise isolating a control section from a fluid section having a constant total outlet orifice area at all times, thereby rendering the valve especially suitable for handling unregulated hot gas from a solid propellant gas generator in the flight attitude control of aero-space vehicles and the like.

BACKGROUND OF THE INVENTION

The present invention relates to the field of valves for the directional control of fluid flow and more specifically to the control of gaseous fluids at elevated temperatures such as are used in rocket propulsion systems. These fluids are commonly at temperatures in the range of 2400° F.

Present state of the art valves give satisfactory performance only for short periods of time on the order of 10 to 20 seconds either because the high temperature of the fluid causes differential expansion of the various components which results in degradation of performance or even lack of performance, or the materials used to seal the components have a limited effective life because of the temperature, or the particle size of the solids present in the fluid cause jamming of the moving parts, or the method of isolating the electrical components from the flow of fluid and/or heat is limited due to weight considerations and the heat destroys these components in time periods as short as these.

Because the end uses of such valve devices are very expensive and complex aero-space vehicles, light weight is an essential characteristic which in some cases contributes to the problems associated with short operable life. Isolation of the control section of the valve is sacrificed for lighter weight.

Also associated with the nature of the end use vehicle is the need for extremely reliable operation and the ability to verify the performance of the valves without actually submitting them to the flow process.

Present valves have met these criteria for limited periods, as has been pointed out, but as rocket propulsion technology advances successful operation of the control valves for much longer periods, 15 minutes or more, is essential, and with minimum weight and maximum reliability.

SUMMARY OF THE INVENTION

The invention herein disclosed has novel features which eliminate the problems associated with hot gas valves in the past or minimize them to such an extent that reliable operation is achieved for periods in excess of 15 minutes with weight comparable to present short life valves.

The nature of these features will best be understood by considering the valve as being comprised of a hot gas section and a control section. This arbitrary distinction is made on the basis of the group of parts which must come in contact with the hot fluid, and therefore must be capable of performing their function at any temperature up to that of the fluid, and that remaining group of parts which by the nature of their operation must be kept at a temperature far below that of the fluid. Parts in the latter group are those which depend on magnetic or physical properties, which are lost or changed above certain temperatures, and their supporting structure.

The hot gas section consists of a chamber having an inlet port and two outlet ports. The outlet ports terminate inside the chamber and alternately are adapted for sealing engagement with a flapper. The relationship of the flapper and outlet ports is such that the flapper and the periphery of the outlet hole which is usually circular define a cylindrical orifice area which increases when the flapper is displaced away from the hole and decreases as the flapper approaches the hole. Furthermore, this relationship is such that as the flapper is displaced to reduce the cylindrical orifice area at one outlet, the orifice area at the other outlet is proportionally increased. Thus, the total outlet cylindrical orifice area remains constant for any position of the flapper tending to increase or decrease one of the cylindrical orifice areas.

This characteristic of the constant total outlet orifice area of the valve is a very important feature particularly when it is used to control the products of combustion of a solid propellant gas generator. The burn rate of such generators is dependent on the pressure in the generator which in turn is dependent on the area of the outlet orifices in the generator-valve system. If the total area is reduced during the valving operation the pressure in the generator is increased and the burning rate is increased which in turn further increases the pressure and burning rate. Conversely, increasing the total outlet orifice area decreases the pressure and burning rate of the generator propellant. In the case of decreasing the total orifice area, the generated gas is produced at a faster rate than is needed and is wasteful and hazardous since the pressure may exceed the strength of the generator case or other pressure chambers. When the total outlet orifice area is increased the gas is produced at a slower rate than required and can even cause the propellant to be extinguished if the area increase is sufficient to lower the generator pressure below that required for sustained burning. Because of these considerations some valve systems have required the use of a constant area sonic orifice between the generator and the inlet to the valve to act as a regulator, but these orifices reduce the efficiency of the system. With the valve of the present invention a regulating orifice is not needed.

It is pointed out that with the embodiment of the present invention hereinafter described this constant total outlet orifice area feature is not merely provided for a given temperature but is provided in a way that it will remain constant over the full temperature range to which the valve may be subjected. This valve construction is such that identical materials may be used for the valve body, outlet orifice seats and flapper, without the danger of galling from sliding relationships, and therefore thermal expansion of the various elements is the same and self compensating so that the critical outlet area is constant regardless of the temperature. The nature of this arrangement also tends to keep the temperature rise the same in all components.

It should also be observed that the success of a valve embodying the present invention is not merely dependent on the selection of materials for it can be made from any number of materials available for high temperature applications and known to those skilled in the art.

The control section of the inventive valve provides the means for controlling and monitoring the position of the flapper in the hot gas section.

Other objects and advantages of the present invention will be apparent from the following description of a preferred embodiment illustrated in the accompanying drawings.

BRIEF DESCRIPTION OF THE DRAWINGS

FIG. 1 is a side elevational view of a flow control valve embodying a preferred construction of the present invention and showing such valve associated with a solid propellant gas generator and arranged in a suggested aero-space vehicle to control the roll thereof.

FIG. 2 is an end elevational view of the valve and associated gas generator shown in FIG. 1, as viewed from the right thereof.

FIG. 5 is a generally horizontal sectional view thereof taken on line 5—5 of FIG. 3.

FIG. 6 is a perspective view of a torsion assembly forming part of the valve as illustrated in FIG. 4, and showing the flapper of such assembly associated with outlets formed in exit nozzles, these nozzles being illustrated greatly separated apart from each other and from the free end of the flapper.

DESCRIPTION OF THE PREFERRED EMBODIMENT

The valve embodying the present invention is illustrated in its application as a hot gas roll control valve for an aero-space vehicle. Referring to FIG. 1, the numeral 10 represents the vehicle generally which has a cylindrical external surface 11. Terminating flush with this cylindrical surface 11 are the outer ends of a pair of nozzle extensions 12 and 13. These nozzle extensions point generally in opposite directions so that if more of a pressurized fluid is discharged from one of the extensions than the other, a generally tangential thrust can be exerted upon the vehicle 10 to rotate it about the axis of its cylindrical surface 11 and in this manner the roll attitude of the vehicle can be controlled.

Figure 3:
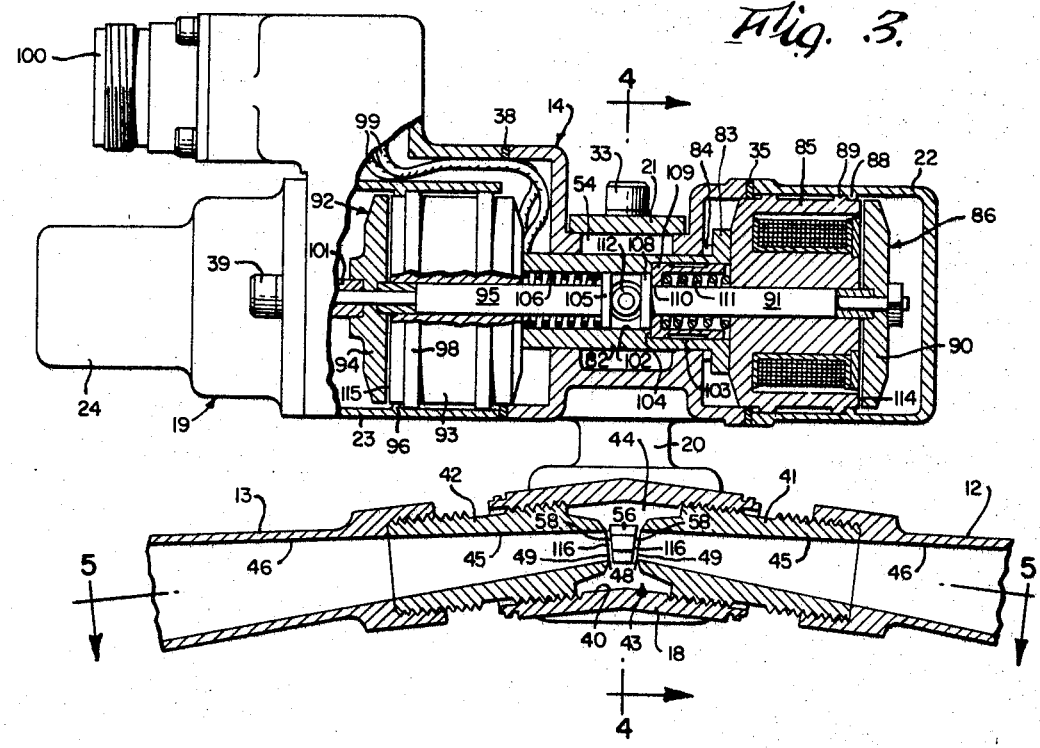
FIG. 3 is an enlarged vertical longitudinal sectional view of the valve with certain portions thereof being illustrated in elevation.

Nozzle extensions 12 and 13 receive hot gas discharged by a valve represented generally by the numeral 14. The hot gas is supplied to valve 14 by a solid propellant gas generator represented generally by the numeral 15. This generator may be of any suitable and known construction and is adapted when ignited to generate a hot gas which is discharged through a conduit 16. The outer end of this conduit is shown as being suitably sealingly connected to a section 18 of a multi-part housing represented generally by the numeral 19. This housing 19 includes other sections 20, 21, 22, 23 and 24, all of which are illustrated in FIG. 3.

Figure 4:
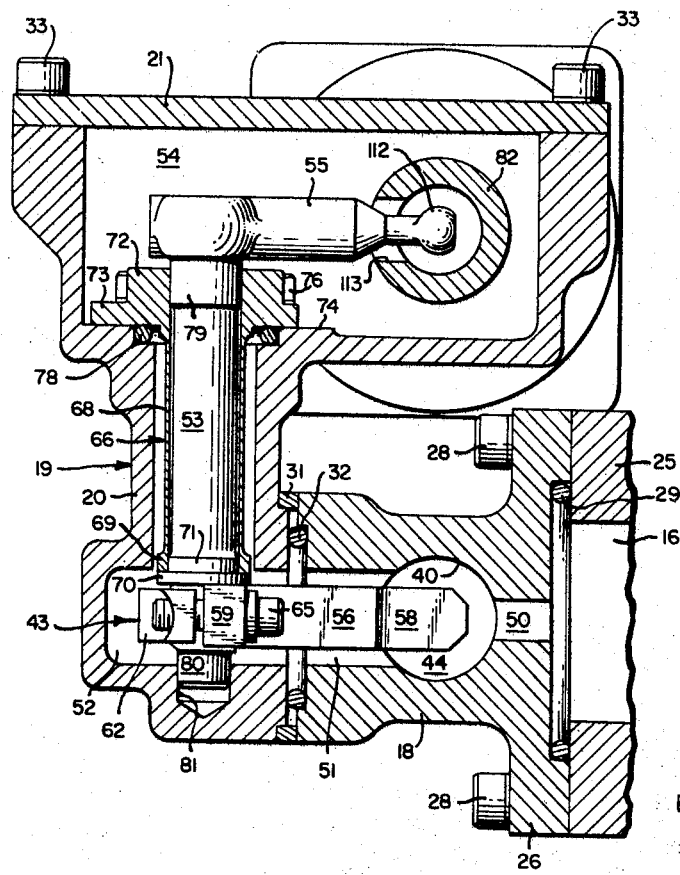
FIG. 4 is a still further enlarged vertical transverse sectional view thereof taken on line 4—4 of FIG. 3.

The outer extremity of conduit 16 is shown in FIG. 4 as outwardly flanged at 25 to engage a flange 26 on housing section 18. These flanges abut each other and are connected together by suitable fasteners such as screws 28. A suitable seal ring 29 preferably of metal is shown operatively arranged between flanges 25 and 26.

Housing section 20 at the other end of housing section 18 is fastened thereto by any suitable fastening means such as the screws 30 shown in FIG. 1. Referring to FIG. 4, a ring 31 of insulating material is interposed between housing sections 18 and 20, as is also a seal ring 32 which may be of any suitable type although illustrated as being similar to ring 29.

Housing section 21 is a plate-like cover secured to the top of housing section 20 and is fastened thereto by suitable fasteners such as screws 33.

Housing section 22 is a cup-shaped cover suitably secured to housing section 20 as by screws 34 (FIG. 1), a gasket 35 being shown interposed between these housing sections.

Housing section 23 is suitably secured to housing section 20 as by screws 36 (FIG. 1), a gasket 38 being shown interposed between these body sections (FIG. 3).

Finally, housing section 24 is another cup-shaped cover which is suitably secured to body section 23 as by screws 39 (FIG. 3).

Returning to housing section 18, the same as shown in FIG. 3 is formed with a through passage 40 the end portions of which are inclined to each other at a slight angle as depicted in this figure. At each end, passage 40 is internally threaded to receive threadedly an exit nozzle member, one such member being designated 41 and associated with nozzle extension 12, and the other being designated 42 and associated with nozzle extension 13. The outer ends of these nozzle members 41 and 42 are externally threaded to be received threadedly in the inner internally threaded ends of nozzle extensions 12 and 13.

The portion of passage 40 unoccupied by the inner ends of nozzle members 41 and 42 and also unoccupied by portions of a torsion assembly, represented generally by the numeral 43 and later to be described, provides a chamber or compartment 44. Each of nozzle members 41 and 42 has an internal through passage 45 which is shown as circular in cross section and enlarges outwardly from its inner end toward its outer end. Each of the nozzle extensions 12 and 13 has an internal tapered circular passage 46 which forms a coterminous extension of the corresponding passage 45.

The inner end of each nozzle member 41 and 42 is shown as chamfered to provide an annular edge or seat 48 which surrounds the entrance port 49 to passage 45. As best shown in FIG. 3, annular seats 48 are severally arranged in planes which are perpendicular to their respective nozzle member axis and hence these planes are inclined to each other. Entrances 49 serve as two outlets for chamber 44.

Housing section 18 is shown in FIG. 4 as having a passage 50 which communicates at one end with conduit 16 and its other end with chamber 44, thus providing a hot gas inlet for such chamber. On the other side of through passage 40 opposite from inlet passage 50, body section 18 is shown as provided with a recess 51 which communicates with the interval space 52 of hollow housing section 20. The portion of this space 52 and passage 51 as well as previously mentioned passage 40, unoccupied by torsion assembly 43, constitutes chamber 44 for which passage 50 is the inlet and nozzle entrance ports 49 are the outlets.

Torsion assembly 43 is shown as comprising a shaft 53 arranged vertically in space 52 of housing section 20. The upper end of this shaft 53 projects upwardly into a compartment 54 provided in housing section 20 and covered by housing section 21. Suitably and non-rotatively fastened as by electron beam welding to the upper extremity of shaft 53 is a radially extending lever 55 for imparting oscillatory or rotational movement to shaft 53 about its vertical longitudinal axis. Adjacent its lower end, shaft 53 has non-rotatively secured thereto, as will be later explained, a flapper member 56 which extends radially outwardly from the shaft. The outer or free end portion of flapper member 56 has an inclined flat surface 58 on each of the two generally vertical and opposite sides of this member, one such surface being opposite and parallel to seat 48 on nozzle member 41 and the other flat surface 58 being opposite and parallel to seat 48 on nozzle member 42. The parallel relationship of seats 48 and surfaces 58, when the flapper member 56 is in a centered position therebetween, is depicted in FIGS. 3 and 5.

While flapper member 56 may be fastened to shaft 53 in any suitable manner the following arrangement is illustrated. At its inner end, flapper member 56 is shown as provided with a pair of laterally extending ears 59 and between them a vertical groove having flat surfaces 60 inclined to each other. These flat surfaces 60 embrace corresponding flat surfaces 61 formed on the opposing portion of shaft 53. A clamp element 62 is shown in FIG. 5 as embracing the generally semicircular portion of shaft 53 and has portions opposite ears 59. These opposite portions provided with threaded holes 63 which aline with unthreaded holes 64 in ears 59. A screw 65 extends through each hole 64 and screws into the corresponding hole 63. When screws 63 are tightened, it will be seen that flapper member is non-rotatively clamped to shaft 53.

Torsion assembly 43 also includes a torsion tube member 66 on which shaft 53 is supported for oscillatory or rotational movement of the shaft about its vertical longitudinal axis. Member 66 has a thin walled torsionally flexible intermediate imperforate cylindrical section 68 which surrounds shaft 53 in closely spaced relation thereto. Member 66 has a constant bore throughout its length. At its lower end member 66 has a thickened annular integral portion 69 the lower end face of which abuts the upwardly facing annular shoulder of a collar 70 formed integrally on shaft 53 immediately above the attachment of flapper member 56. This shaft is also slightly enlarged immediately above collar 70 as indicated at 71, to fit closely the bore of member 66. These engaging portions 69–71 are preferably electron beam welded together to provide a sealed connection between flexure member 66 and shaft 53.

At its upper end torsion tube member 66 is shown as having a thickened integral portion indicated at 72 from which an integral attaching flange 73 extends horizontally outwardly. Flange 73 overlays a flat internal horizontal surface 74 on housing section 20 and is suitably secured thereto. For this purpose, flange 73 is shown as having vertical holes 75 through each of which a screw 76 extends and is threaded into a recess provided in housing section 20. A seal ring 78 similar to seal rings 29 and 32 is shown as operatively interposed between the thickened portion 72 of member 66 and housing section 20.

As will be more apparent later herein, when shaft 53 with its attached lever 55 and flapper 56 is rotated about the longitudinal axis of this shaft, there are side loads imposed on the shaft. In order to provide reaction for such side loads, shaft 53 immediately under lever 55 is shown as having an enlarged cylindrical portion 79 which has a small diametral clearance with the cylindrical bore wall of torsion tube member 66. Also, the lower end portion of shaft 53 immediately under flapper 56 is shown as having a reduced cylindrical portion 80 which has a small diametral clearance with the wall of a cylindrical recess 81 provided in housing section 20.

From the construction so far described it will be seen that hot gas chamber 44 is isolated by torsion tube member 66 from a control compartment 54 in which lever 55 is arranged. Torsion tube member 66 serves as a pressure barrier between hot gas chamber 44 and control compartment 54 and at the same time permits rotary motion initiated at the lever end of shaft 53 in the control compartment to be transmitted through this shaft to flapper 56 in the hot gas chamber. This transmission of rotary motion is made possible by the ability of tube member 66 to be torsionally deflected. The forces required for such torsional deflection will be explained later herein to have a further advantage.

Rotary motion of the shaft 53 for control of the flapper position, which effects changes in the flow of hot gas through the outlet orifices provided by the space between flapper tip surfaces 58 and seats 48 is accomplished by applying a force F to one side or on oppositely directed force F' to the other side of the free end of shaft lever, as depicted in FIG. 6. This force can be from any actuator, manual, mechanical, electrical, or, as shown by electromagnet solenoid means.

The illustrated electromagnetic solenoid means will now be described to provide a three position valve electrically controlled.

Referring to FIG. 3, a sleeve 82 is horizontally supported on housing section 20 and traverses control compartment 54. At one end this sleeve has a head 83 and a spacer 84 is interposed between this head and a wall portion of housing section 20. On the other side of head 83 and abutting the same is a stationary solenoid coil body 85 of a solenoid represented generally by the numeral 86. An inwardly extending annular lug 88 on housing section or cover 22 engages an outwardly extending annular rib 89 on body 85 and thereby holds this body against head 83. Solenoid 86 is also shown as including at its outer end a movable armature 90 suitably rigidly connected to one end of a push rod 91 extending horizontally, centrally and slidably through coil body 85.

A similar solenoid 92 is arranged at the other end of sleeve 82 and includes a coil body 93, and an armature 94 mounted on a push rod 95. The inner end of body 93 abuts the end of sleeve 82. An inwardly extending annular lug 96 on housing section 23 engages an outwardly extending annular rib 98 on body 93.

Solenoids 86 and 92 are connected by suitable wire leads indicated typically at 99 to a suitable conventional electrical connector suitably mounted on housing section 23. The position of push rod 95 is sensed by a suitable transducer housed within section or cover 24 and having a movable element 101 shown rigidly connected to rod 95.

Sleeve 82 has a horizontal through bore 102 and that end portion thereof adjacent solenoid 86 is counterbored as indicated at 103 to provide a shoulder 104. Left push rod 95 has a head 105 slidably arranged in bore 102. A minor helical compression spring 106 surrounds rod 95 and at one end bears against head 105 and at its other end bears against coil body 93.

Right push rod 91 also has a head 108 slidably arranged in bore 102. A detent piston 109 is slidably arranged in counterbore 103 and has an axial length slightly less than the distance between shoulder 104 and the opposing or inner end face of coil body 85. Piston 109 has a central hole 110 through which push rod 91 extends. A major helical compression spring 111 surrounds this rod 91 and at one end bears against piston 109 and at its other end bears against coil body 85.

Push rod heads 105 and 108 are spaced apart and between them is interposed the spherical head 112 formed on the free end of control lever 55. This lever projects through a hole 113 in sleeve 82.

When neither solenoid 86 or 92 is energized major spring 111 pushes detent piston 109 against shoulder 104. Minor spring 106 pushs left push rod head 105 against lever head 112 which in turn is pushed against right push rod head 108, thereby pushing this head 108 against detent piston 109. In this condition of the parts, as depicted in FIG. 3, it will be noted that a slight clearance 114 exists between right armature 90 and coil body 85 and a similar clearance 115 exists between left armature 94 and coil body 93.

In this manner flapper 56 is maintained in a null or centered position as depicted in FIGS. 3 and 5. In such position an equal spacing exists between flapper tip surfaces 58 and exit nozzle seats 48, such spacing being indicated at 116 in FIGS. 3 and 5.

The circumference of each circular outlet port 49 multiplied by the actual spacing 116, whatever it may be at a given time depending upon the position of the flapper 56 relative to seats 48, provides a cylindrical outlet orifice area for chamber 44 on each side of the flapper. Thus the total outlet orifice area is the sum of the two individual outlet orifice areas. This total outlet orifice area remains constant at all times, even though the individual outlet orifice areas are specifically different although they vary differentially. This means that when flapper 56 moves from its centered position, one outlet orifice area on one side of the flapper increases a certain amount while the outlet orifice area on the other side of the flapper decreases a like amount, thus making no change in the total outlet orifice area for hot gas chamber 44.

OPERATION

It is asumed that gas generator 15 is ignited and supplying pressurized hot gas to chamber 44.

With both solenoids 86 and 92 deenergized the shaft lever 55, and therefore the flapper 56, is held in a null position by the spring detent arrangement located around the solenoid push rods 91 and 95. This null is defined as that position of the flapper between the two outlet ports where the two cylindrical orifice areas are equal and flow is equal at each outlet port. By energizing one of the two solenoids shaft 53 is rotated so that flapper 56 engages the seat 48 around the outlet port 49 opposite the energized solenoid and shuts off the flow through that outlet port while increasing the flow from the other port. If the other solenoid alone is energized the flow will be stopped from the outlet port opposite that solenoid and increased at the other. Deenergizing both solenoids reestablishes equal flow at both outlets.

As simple and elementary as this valving action is, the ability to repeat it reliably throughout extended periods is possible only because of the effective and substantially frictionless sealing of the torsion tube member 66. This tubular seal prevents leakage flow which would cause heating of the control section. At the same time, the torsion tube confines the hot fluid and its solid particles to the hot gas section which does not have parts moving in close relationship to each other and which could be jammed by such particles.

The torsion tube arrangement also gives a minimum conductive heat path into the control section which is thereby remote from the hot gas section at a minimum of weight.

The torque associated with the deflection of the torsion tube 68 is a great advantage. In the null position all of the pressure forces on the flapper 56 are equal and opposite so that the flapper is balanced. But, as the flapper is moved to either side of null, the differential flow through the outlet ports 49 causes an unbalance in forces on the flapper. These forces, known as Bernoulli flow forces, act in the direction which tends to close further the cylindrical orifice area which is being reduced by flapper motion. The effect of these Bernoulli flow forces is decentering such that the flapper must be held with ever increasing force as it moves to close either outlet port.

Normally the controlling actuator is made with sufficient size and force output such as is required to overcome the decentering force gradient associated with the flow forces. In the present invention, however, the torsion tube is designed to have a torsional spring rate just equal in magnitude to the decentering force gradient associated with fluid flow. The result is an effective counterbalancing of force gradients which significantly reduces the size, weight and power consumption of the controlling actuator. In addition, the inventive device achieves this counterbalancing of forces at the flapper end of the shaft where it is most effective and where it reduces the load and deflection of the shaft.

A result of these small controlling forces is that this valve can be made in sizes that have sufficient flow to perform useful functions directly without the need of a subsequent pressure operated valve. This greatly enhances the reliability of the system in which it is used, not only because of the simplicity but because of the ability to verify the operability of all moving parts after the valve is assembled in the system and before it is pressurized for use. This verification can be accomplished by any of a number of means that are available and known to those skilled in the art for observing the relative position of any of the moving parts.

Having both the hot gas and control sections of the valve in mind, and referring back to the importance of the constant outlet orifice area it will be noted from the valve construction illustrated that this feature is preserved. Of necessity there are thermal gradients involved in the transition from the hot gas section to the control section and, therefore, differential thermal expansion of components of the valve. However, all of these variations are oriented to be in directions which have no effect on the size of the cylindrical orifices on either side of the flapper.

What is claimed is:

1. A valve, comprising a housing, a shaft, a torsion tube surrounding said shaft, means sealingly securing one end of said tube to said housing, means sealingly securing the other end of said tube to said shaft intermediate the ends thereof, said housing, tube and shaft jointly providing a fluid compartment on one side of said tube, means providing a fluid inlet for said compartment, means providing a pair of fluid outlets for said compartment, a member in said compartment oscillatable to control differentially the flow of fluid through said outlets, means securing said member for such movement to that end of said shaft in said compartment, the spatial relation between said member and outlets providing a constant outlet orifice area at all times, and control means operatively associated with the other end of said shaft for oscillating the same and arranged on the other side of said tube.

2. A valve according to claim 1, wherein said shaft is reactively guided on said housing during its oscillatory movement.

3. A valve according to claim 2 wherein said shaft is additionally reactively guided by contact of an enlarged portion of said shaft with the bore of said tube.

4. A valve according to claim 1, wherein said fluid outlets are opposed and spaced apart, and said member extends radially from said shaft and has its free end arranged between said outlets.

5. A valve according to claim 1, wherein said member securing means includes angled flat surfaces on one side of said shaft, flat surfaces on said member engaging such shaft flat surfaces, a clamp element embracing the other side of said shaft and fastening means securing said clamp element to said member.

6. A valve according to claim 5, wherein said shaft is provided with said flat surfaces between a cylindrical end portion of said shaft and the place of securement of said tube to said shaft, said housing being provided with a recess receiving and reactively guiding said cylindrical end portion.

7. A valve according to claim 1, wherein the tube-to-housing securing means includes a thickened and outwardly extending annular attaching flange overlying a portion of said housing and fastener means attaching said flange to said housing.

8. A valve according to claim 1, wherein the tube-to-shaft securing means includes a collar on said shaft, and said other end of said tube has a thickened portion abutting said collar and being welded thereto.

9. A valve according to claim 1, wherein said tube has a torsional spring rate that provides a force substantially equal but opposite to the Bernoulli flow forces on said member due to any unbalance of fluid flows through said outlets.

10. A valve suitable for handling the hot gas from a solid propellant generator, comprising a housing, a shaft, a torsion tube surrounding said shaft, means sealingly securing one end of said tube to said housing, means sealingly securing the other end of said tube to said shaft intermediate the ends thereof, said housing, tube and shaft jointly providing a compartment on one side of said tube and having an inlet adapted to receive unregulated hot gas from said generator, means providing a pair of hot gas outlets for said compartment, a member in said compartment oscillatable to control differentially the flow of hot gas through said outlets, means securing said member for such movement to that end of said shaft in said compartment, the spatial relation between said member and outlets providing a constant outlet orifice area at all times, and control means operatively associated with the other end of said shaft for oscillating the same and arranged on the other side of said tube.

11. A valve according to claim 10 wherein the portion of said housing on the side of said tube opposite from said one side provides a control section, and the portion of said housing defining said compartment provides a fluid section, said control section being thermally isolated from said fluid section.

References Cited
UNITED STATES PATENTS

| | | | |
|---|---|---|---|
| 2,793,540 | 5/1957 | Cronk | 137—85 X |
| 2,933,106 | 4/1960 | Gerwig et al. | 137—625.62 |
| 3,028,880 | 4/1962 | Reitman | 137—625.61 |
| 3,095,002 | 6/1963 | Healy | 137—625.64 |
| 3,117,585 | 1/1964 | Gerwig et al. | 137—625.61 |

M. CARY NELSON, Primary Examiner

M. O. STURM, Assistant Examiner